(12) United States Patent
Aubin et al.

(10) Patent No.: US 7,787,770 B2
(45) Date of Patent: Aug. 31, 2010

(54) METHODS FOR CO-MODELLING AND ANALYZING PACKET NETWORKS OPERATING OVER OPTICAL NETWORKS

(75) Inventors: Raymond Aubin, Hull (CA); Hadi Nasrallah, Ottawa (CA)

(73) Assignee: Ciena Corporation, Linthicum, MD (US)

( * ) Notice: Subject to any disclaimer, the term of this patent is extended or adjusted under 35 U.S.C. 154(b) by 1863 days.

(21) Appl. No.: 10/764,516

(22) Filed: Jan. 27, 2004

(65) Prior Publication Data

US 2004/0186701 A1  Sep. 23, 2004

Related U.S. Application Data

(60) Provisional application No. 60/442,758, filed on Jan. 27, 2003.

(51) Int. Cl.
*H04B 10/20* (2006.01)
(52) U.S. Cl. ............................ 398/58; 398/25; 703/13
(58) Field of Classification Search ................. 398/25, 398/58; 703/13
See application file for complete search history.

(56) References Cited

U.S. PATENT DOCUMENTS

2004/0107382 A1*  6/2004  Doverspike et al. ............ 714/4
2005/0043933 A1*  2/2005  Rappaport et al. ............ 703/1
2006/0209785 A1*  9/2006  Iovanna et al. ............ 370/351

FOREIGN PATENT DOCUMENTS

EP  1146682  10/2001

OTHER PUBLICATIONS

Ghani, N. IP Over Optical. Sorrento Networks. Tutorial presented at OPTICOMM 2000, Dallas, TX, Oct. 2000. accessed on Jul. 2, 2008 <http://www.triumf.ca/canarie/amsterdam-test/optical-Nasir.pdf>.*
Ghani, N. IP-Over-WDM Integration Strategies. Nokia. Sprint Research Symposium, University of Kansas, Kansas, Mar. 8-9, 2000. accessed on Jul. 2, 2008 <http://www.ittc.ku.edu/workshops/spartan/2000/Nasir_Ghani.pdf>.*
Kodialam, M. et al. "Integrated dynamic IP and wavelength routing in IP over WDM networks." IEEE INFOCOM 2001. Twentieth Annual Joint Conference of the IEEE Computer and Communications Societies. Proceedings. Apr. 22-26, 2001: 358-366, vol. 1.*

(Continued)

*Primary Examiner*—Leslie Pascal
(74) *Attorney, Agent, or Firm*—Kent Daniels; Blake, Cassels & Graydon LLP

(57) ABSTRACT

A method is provided for co-modelling and analyzing a packet network operating over an optical network. The method includes co-modelling the packet network and the optical network by generating a basic packet capacity based on a simulated packet network comprising packet network topology information and packet traffic information and generating a basic optical capacity based on a simulated packet transport network comprising optical network topology information and the basic packet capacity. The output of the co-modelled network is then used to perform analysis on the simulated packet transport network. For example, embodiments of the present invention provide methods of survivability analysis for providing packet link is protection in either the packet network or the optical network of the simulated packet transport network.

16 Claims, 12 Drawing Sheets

OTHER PUBLICATIONS

Liu, K.H. IP Over WDM. The Atrium, Southern Gate, Chichester, West Sussex, England: John Wiley & Sons Ltd, 2002.*

R. Aubin and H. Nasrallah, "MPLS and ASON Restoration Synergy," MPLS World Congress, Feb. 2003.

P. Demeester et al., "Resilience in Multilayer Networks", IEEE Communications Magazine, pp. 70-75, Aug. 1999.

M. Gryseels et al., "Optimal Design for Service Resilience in ATM on SDH Backbone Networks," IEEE ATM Workshop, pp. 400-409, May 1998.

Y. Miyao and H. Saito, "Optimal Design and Evaluation of Survivable WDM Transport Networks," IEEE Journal on Selected Areas in Communications, vol. 16, No. 7, pp. 1190-1198, Sep. 1998.

L. Sahasrabuddhe, S. Ramamurthy, and B. Mukherjee, "Fault Management in IP-over-WDM Networks: WDM Protection Versus IP Restoration," IEEE Journal on Selected Areas in Communications, vol. 20, No. 1, pp. 21-33, Jan. 2002.

Q. Zhen and G. Mohan, "Protection Approaches for Dynamic Traffic in IP/MPLS-over-WDM Networks," IEEE Optical Communications, pp. S24-S29, May 2003.

H. Nasrallah, et al., "NetCalc 6 Turtorial and a Preview of NetCalc7", Aug. 27, 2002.

R. Aubin and H. Nasrallah, "MPLS Fast Reroute and Optical Mesh Protection: A Comparative Analysis of the Capacity Required for Packet Link Protection" Proceedings of the $4^{th}$ International Workshop on Design of Reliable Communication Networks, Banff, Alberta, Canada, pp. 349-355, Oct. 19-22, 2003.

J. Vasseur et al., "MPLS Traffic Engineering Fast Rerout: Bypass Tunnel Path Computation for Bandwidth Protection", IETF Internet Draft, Feb. 2003.

Ping Pan, Ed, et al., "Fast Reroute Extensions to RSVP-TE for LSP Tunnels", IETF Internet Draft, Aug. 2003.

N. Ghani, S. Dixit and T-S Wang, On IP-over-WDM Integration, IEEE Communications Magazine, IEEE Service Center, Piscataway, NJ, US, vol. 28, No. 3, Mar. 2000, pp. 72-84, XP000948526.

N. Ghani, S. Dixit, "Channel Provisioning for Higher-Layer Protocols in EDM Networks", Proceedings of the SPIE, Spie, Bellingham, VA, US. vol. 3843, 1999, pp. 22-32, XP000972319.

* cited by examiner

METHODS FOR CO-MODELLING AND ANALYZING PACKET NETWORKS OPERATING OVER OPTICAL NETWORKS

RELATED APPLICATIONS

This application claims priority from U.S. Provisional Patent Application No. 60/442,758 filed on Jan. 27, 2003.

FIELD OF THE INVENTION

The invention relates to methods of co-modelling and analyzing packet networks that operate over optical networks.

BACKGROUND OF THE INVENTION

Increasingly, Internet Protocol/Multiprotocol Label Switching (IP/MPLS) networks must be able to support high availability services such as voice transmission. In order to meet this requirement on their own, IP/MPLS networks, comprising a packet network and an underlying optical network, must be able to achieve the level of reliability and maintenance traditionally available in transport networks. One aspect of providing this reliability is deciding in which network packet link protection should be implemented.

In response to this dilemma, protection mechanisms operating in the packet network such as MPLS fast reroute have been designed that can protect services in time frames equivalent to Synchronous optical Networks (SONET) automatic protection switching once a failure has been detected. Like any other similar scheme, MPLS fast reroute is required to maintain additional protection-specific bandwidth.

In parallel to advances developed in the protection of packet networks, optical networks have also evolved to support new types of architectures and protection schemes. These schemes, such as mesh protection, have been designed to be more flexible and efficient.

The development of improved protection methods in both optical networks and packet networks has created an opportunity for service and network engineers to choose how to best implement packet link protection.

When trying to decide how and where to implement packet link protection in a packet transport network, one criterion worth examining is the bandwidth requirement of each method of protection.

If packet link protection is completely handled by the packet network, no protection is required in the optical network. Therefore the packet network can use an unprotected optical connection service. If a packet link is protected by the optical network, then MPLS fast reroute or an alternative protection scheme is not required in the packet network. Using the full complement of both MPLS fast reroute and optical mesh protection results in a waste of resources.

SUMMARY OF THE INVENTION

Examining bandwidth requirements of packet protection schemes performed in the packet network or the optical network allows a user to evaluate different factors related to a resulting packet transport network. For example, determining the cost of a resulting packet transport network using separate methods of packet link protection could fundamentally affect a strategy for designing a new packet transport network or modifying an existing packet transport network.

Prior to examining packet protection schemes it is necessary to co-model a packet network operating over an optical network. A method for co-modelling the packet network and optical network involves using information that describes network routers and how they are interconnected and information that describes traffic that flows in and out of the packet network are used to assign packet capacity to the various packet links between routers. The packet capacity output and information that describes optical cross-connects which provide access to the optical network from the network routers and how they are interconnected are then used to assign optical capacity to the various optical links in the optical network. This results in a simulated packet transport network output which details capacity information regarding the packet network and the optical network. This output may than be used to analyze or examine different aspects of the simulated packet transport network. For example, analysis of the resulting simulated packet transport network can include evaluation of protection requirements by performing survivability analysis. It can also include network capacity planning.

A survivability analysis on the network allows a user to simulate a failure of any single optical link in the simulated packet transport network and examine how this affects the traffic carrying requirements of the network. The invention provides methods for performing survivability analysis that can be performed on either the packet network or the optical network of the output simulated packet transport network.

The co-modelling of the packet and optical networks and further analysis are implemented by computer algorithms. The computer algorithms may perform only the aspect of generating the simulated packet transport network, may perform only analysis on the simulated packet transport network output, or may perform both the generation of the simulated packet transport network and analysis on the output.

According to one aspect of the present invention, there is provided a method for co-modelling a packet network operating over an optical network, the method comprising the steps of: (1) generating a basic packet capacity based on a simulated packet network comprising packet network topology information and packet traffic information and (2) generating a basic optical capacity based on a simulated packet transport network comprising optical network topology information and the basic packet capacity.

According to another aspect of the present invention, there is provided a method for co-modelling and analyzing a packet network operating over an optical network, the method comprising the steps of: (1) generating a basic packet capacity based on a simulated packet network comprising packet network topology information and packet traffic information; (2) generating a basic optical capacity based on a simulated packet transport network comprising optical network topology information and the basic packet capacity; and (3) performing analysis on the simulated packet transport network.

According to still another aspect of the present invention, there is provided a method for analyzing survivability of a simulated packet transport network comprising a packet network and an optical network, wherein the packet network is operating over the optical network, wherein an optical failure is known to occur within the simulated packet transport network and wherein packet link protection is performed in the packet network, the method comprising the steps of: establishing at least one back-up packet traffic flow tunnel for each packet link in the simulated packet transport network; performing a series of steps, as follows, for each optical link in the optical network; A. taking an optical link out of service; B. performing a series of steps, as follows, in a nested process for each packet link affected by the optical failure; i. switching all packet traffic flow on the affected packet link to an at least one back-up packet traffic flow tunnel; ii. incrementing capacity of each packet link traversed by the at least one back-up packet traffic flow tunnel; and iii. incrementing capacity of each optical link traversed by an optical connection supporting the packet link; and C. restoring initial capacity values; and summing packet link capacity requirements and optical link capacity requirements.

According to yet another aspect of the present invention, there is provided a method for analyzing survivability of a simulated packet transport network comprising a packet network and an optical network, wherein the packet network is operating over the optical network, wherein an optical failure is known to occur within the simulated packet transport network and wherein packet link protection is performed in the optical network, the method comprising the steps of: establishing at least one protection tunnel for each optical connection in the simulated packet transport network; performing a series of steps, as follows, for each optical link in the optical network; A. taking an optical link out of service; B. switching all affected optical connections to an at least one protection tunnel; C. incrementing capacity of each optical link traversed by the at least one protection tunnel; and D. restoring initial capacity values; and summing the optical link capacity requirements.

According to a further aspect of the present invention, there is provided a computer useable medium having computer readable program code means for co-modelling a packet network operating over an optical network, the computer readable program code means comprising: (1) code means for generating a basic packet capacity based on a simulated packet network comprising packet network topology information and packet traffic information; and (2) code means for generating a basic optical capacity based on a simulated packet transport network comprising optical network topology information and the basic packet capacity.

According to yet a further aspect of the present invention, there is provided a computer useable medium having computer readable program code means for co-modelling and analyzing a packet network operating over an optical network, the computer readable program code means comprising: (1) code means for generating a basic packet capacity based on a simulated packet network comprising packet network topology information and packet traffic information; (2) code means for generating a basic optical capacity based on a simulated packet transport network comprising optical network topology information and the basic packet capacity; and (3) code means for performing analysis on the simulated packet transport network.

According to still a further aspect of the present invention, there is provided a computer useable medium having computer readable program code means for analyzing survivability of a simulated packet transport network comprising a packet network and an optical network, wherein the packet network is operating over the optical network, wherein an optical failure is known to occur within the simulated packet transport network and wherein packet link protection is performed in the packet network, the computer readable program code means comprising: code means for establishing at least one back-up packet traffic flow tunnel for each packet link in the simulated packet transport network; code means for performing a series of steps, as follows, for each optical link in the optical network; A. taking an optical link out of service; B. performing a series of steps, as follows, in a nested process for each packet link affected by the optical failure; i. switching all packet traffic flow on the affected packet link to an at least one back-up packet traffic flow tunnel; ii. incrementing capacity of each packet link traversed by the at least one back-up packet traffic flow tunnel; and iii. incrementing capacity of each optical link traversed by an optical connection supporting the packet link; and C. restoring the initial capacity values; and code means for summing packet link capacity requirements and optical link capacity requirements.

According to another aspect of the present invention, there is provided a computer useable medium having computer readable program code means for analyzing survivability of a simulated packet transport network comprising a packet network and an optical network, wherein the packet network is operating over the optical network, wherein an optical failure is known to occur within the simulated packet transport network and wherein packet link protection is performed in the optical network, the computer readable program code means comprising: code means for establishing at least one protection tunnel for each optical connection in the simulated packet transport network; code means for performing a series of steps, as follows, for each optical link in the optical network; A. taking an optical link out of service; B. switching all affected optical connections to an at least one protection tunnel; C. incrementing capacity of each optical link traversed by the at least one protection tunnel; and D. restoring initial capacity values; and code means for summing the optical link capacity requirements.

Other aspects and features of the present invention will become apparent to those ordinarily skilled in the art upon review of the following description of specific embodiments of the invention in conjunction with the accompanying figures.

BRIEF DESCRIPTION OF THE DRAWING

Preferred embodiments of the invention will now be described with reference to the attached drawings in which.

DETAILED DESCRIPTION OF THE PREFERRED EMBODIMENTS

Figure 1:
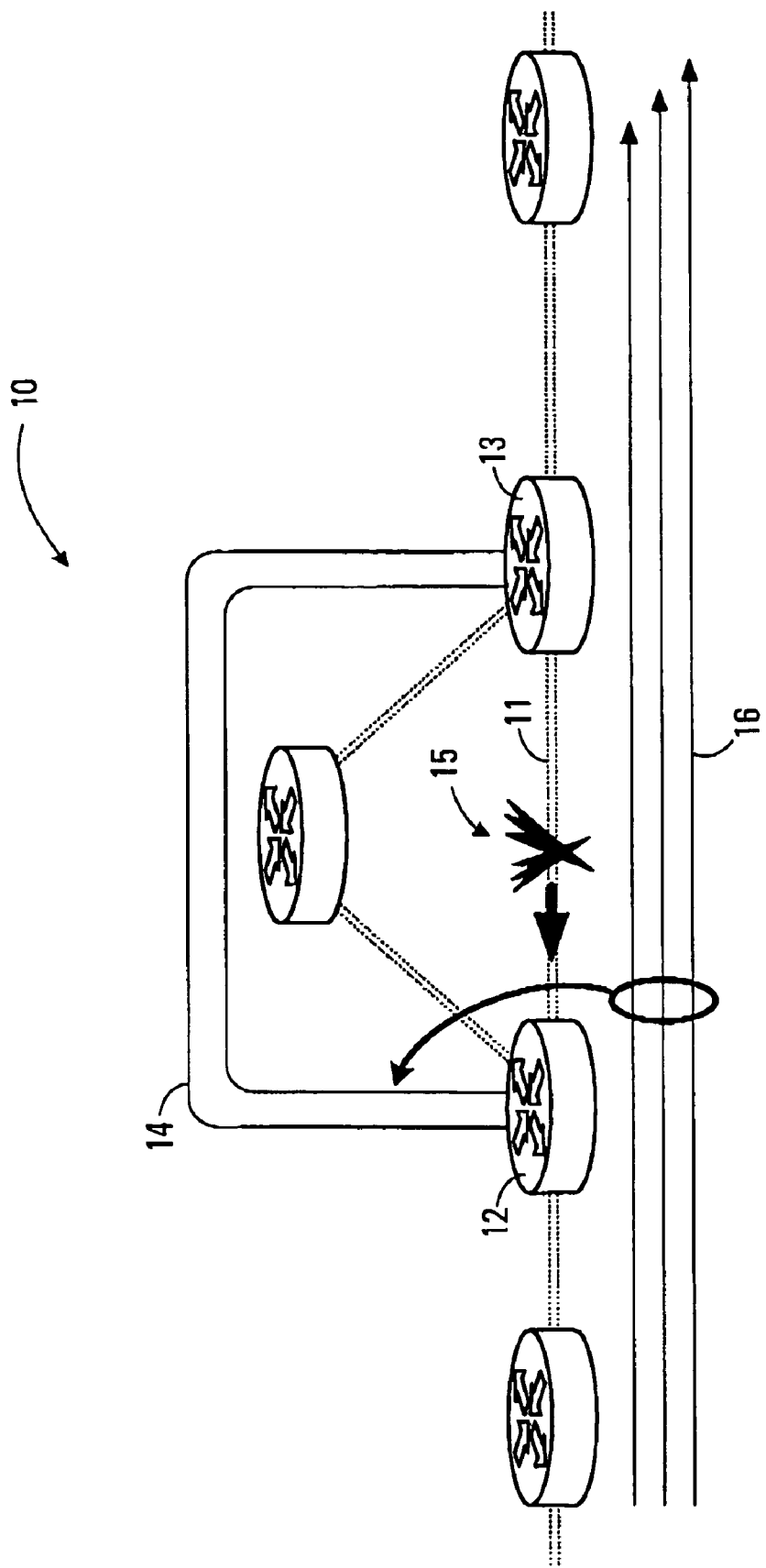
FIG. 1 is a schematic depicting a portion of a packet network which uses Multiprotocol Label Switching (MPLS) fast reroute as a packet link protection scheme.

MPLS fast reroute is a localized packet link protection mechanism for use within a packet network. An example of how MPLS fast reroute works is demonstrated in FIG. 1. A portion of a packet network 10 is shown to be comprised of a protected packet link 11 containing at least one Label Switched Path (LSP) 16, a back-up LSP tunnel 14 and first and second routers 12,13. The first router 12 is connected to the second router 13 by the protected packet link 11. The first router 12 and the second router 13 are also connected by the back-up LSP tunnel 14. A failure 15 is located on the protected packet link 11.

In normal operation, when the protected packet link 11 between the routers 12,13 is configured, the MPLS fast reroute protocol establishes an alternative shortest route packet link around the protected packet link 11, which is the back-up LSP tunnel 14.

In the operational stage depicted in FIG. 1, the failure 15 of the protected packet link 11 is detected and fault information is propagated to the first router 12. The at least one LSP 16 normally carried by the protected packet link 11 is encapsulated and re-routed to the back-up LSP tunnel 14 at the first router 12. The at least one LSP 16 that is re-routed and carried on the back-up LSP tunnel 14 is un-encapsulated at the second router 13.

It is important to ensure that there is enough bandwidth capacity on the route established as the back-up LSP tunnel to accommodate the packets that are re-routed. If not enough capacity can be found on the shortest back-up route, then more than one back-up tunnel can be configured, using different routes. This allows for a general condition that there can be more than one back-up LSP tunnel per protected packet link. However, it is critical that none of the back-up tunnels be part of the same shared risk link group as the protected packet link. That is, they should not use the same underlying optical links.

MPLS fast reroute implementations achieve the 50 ms switch-over time required by high availability applications.

Figure 2:
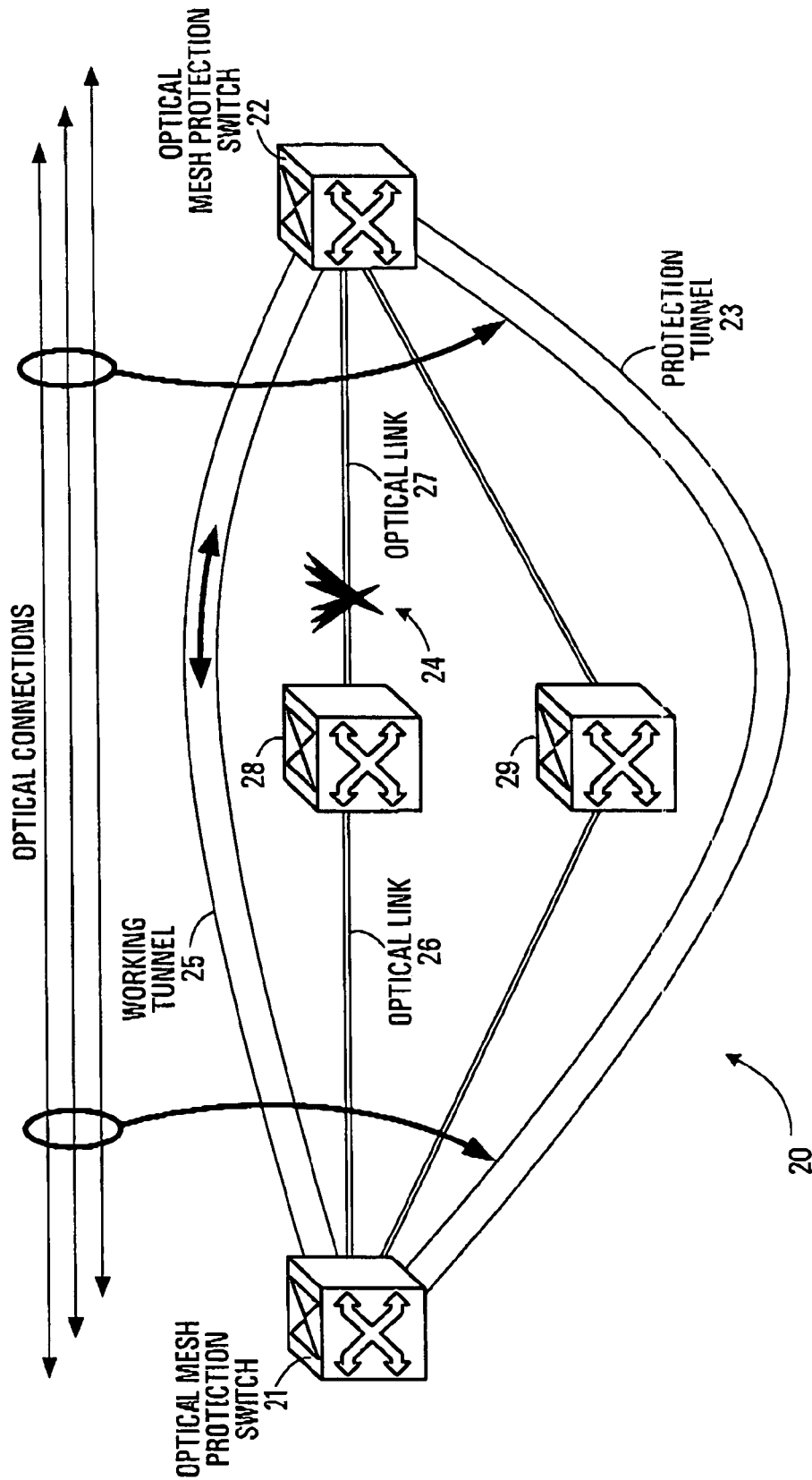
FIG. 2 is a schematic depicting a portion of an optical network which uses optical mesh protection as a packet link protection scheme.

Optical mesh protection operates on the basis of end-to-end optical paths. FIG. 2 shows an example of packet link protection in an optical network using optical mesh protection. A portion of an optical network 20 contains a working tunnel 25, a protection tunnel 23 and fist and second optical mesh protection cross-connect switches 21,22. The working tunnel 25 is connected between the first optical mesh protection cross-connect switch 21 and the second optical mesh protection cross-connect switch 22 via a third optical mesh protection cross-connect switch 28. The protection tunnel 23 is also connected between the first optical mesh protection cross-connect switch 21 and the second optical mesh protection cross-connect switch 22. In this example, the protection tunnel 23 is routed through a fourth optical mesh protection cross-connect switch 29. The working tunnel 25 and the protection tunnel 23 each have an associated control channel (not shown).

During normal operation the working tunnel 25 is configured to support optical connections between the two optical mesh protection cross-connect switches 21,22 via an optical path, in this example the optical path includes a first optical link 26, the third optical mesh protection cross-connect switch 28 and a second optical link 27. When an optical link failure 24 occurs as shown in FIG. 2, fault information is propagated along the control channel of the working tunnel 25. The optical mesh protection cross-connect switches 21,22 at both ends of the optical path perform the switch-over of optical connections from the working tunnel 25 to the protection tunnel 23. Proper synchronization of a signal being transmitted is maintained using the control channel of the protection tunnel 23.

Under a conventional assumption of a single failure, it is possible for two or more working tunnels to share the same protection tunnel in whole or in part.

Following the optical link failure 24 of the working tunnel 25 and a switch-over to the protection tunnel 23, it is possible to temporarily establish another protection tunnel in order to cover the rare case of double failure.

The protection tunnel 23 is released once the optical link failure 24 is repaired and the workings tunnel is re-established.

When determining the best manner of packet link protection for a specific situation it is valuable to evaluate the protection schemes based on various criteria. One important criterion to examine is the bandwidth requirement of each method of protection. Modelling a packet transport network comprising both the packet and optical networks allows a user to evaluate different system conditions and compare resulting bandwidth requirements for various methods of packet link protection.

Figure 3:
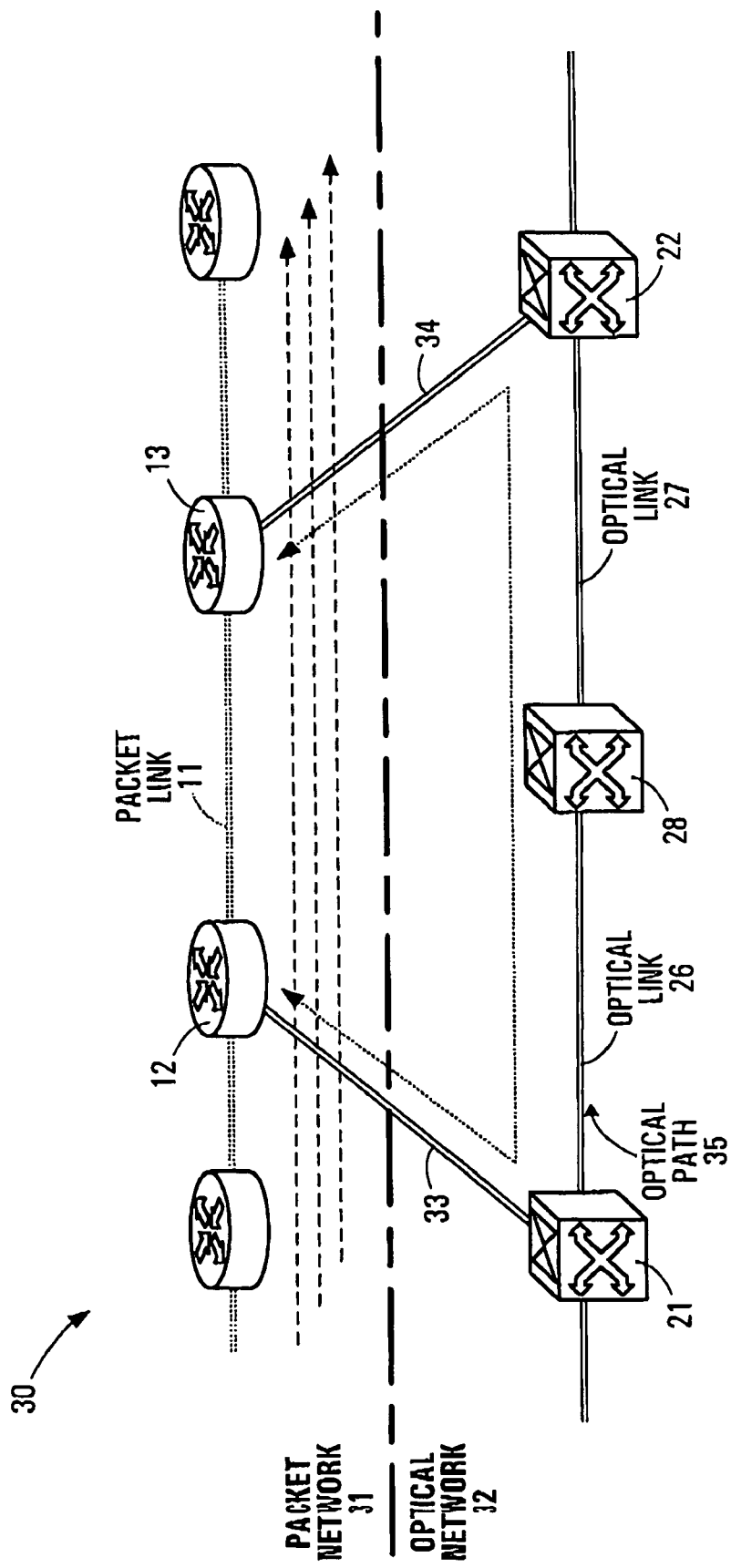
FIG. 3 is a schematic showing a portion of a packet transport network comprised of a packet network and an underlying optical network.

FIG. 3 depicts an overall view of a packet transport network 30 comprising both a packet network 31 and an optical network 32. The packet network 31 is similar to that which is represented in FIG. 1. The optical network 32 is similar to that which is represented in FIG. 2. There are three distinct segments used as optical connections within the optical network 32 when communicating with the packet network 31. The three segments include two access links 33,34 and an optical path 35.

A first access link 33 connects the first router 12 located in the packet network 31 to the first optical mesh protection cross-connect switch 21 located in the optical network 32. The optical path 35 connects the first optical mesh protection cross-connect switch 21 to the second optical mesh protection cross-connect switch 22. In this example, the optical path 35 includes the third optical mesh protection cross-connect switch 28 and the first and second optical links 26,27 which are all located in the optical network 32. A second access link 34 connects the second optical mesh protection cross-connect switch 22 to the second router 13 that is located in the packet network 31. The packet link 11 connects the first and second routers 12,13 in the packet network 31.

Figure 4:
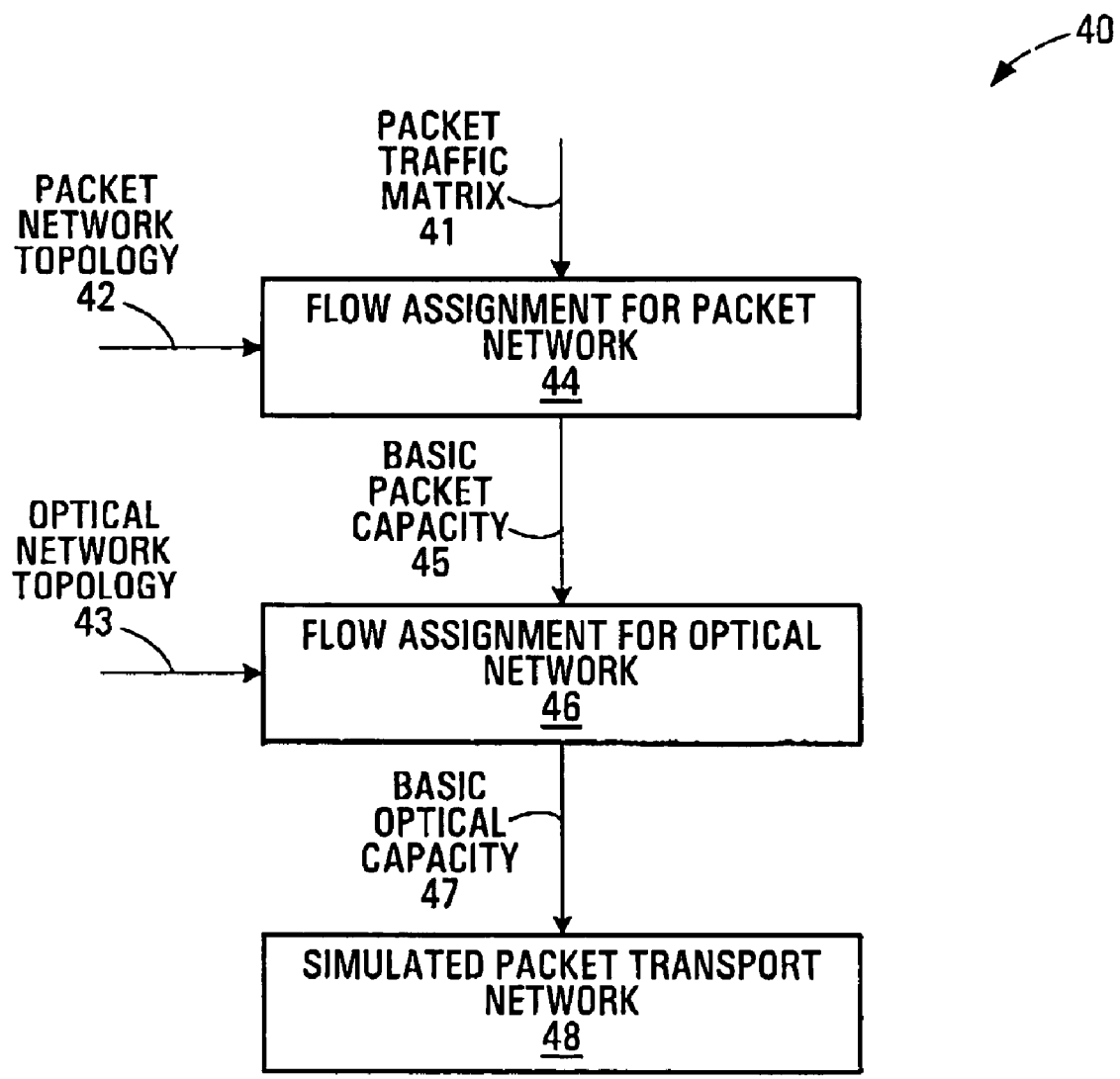
FIG. 4 is a flow diagram which demonstrates the steps involved with co-modelling a packet network and an optical network.

FIG. 4 illustrates a main process 40 in which steps are used to co-model a packet network and an optical network wherein the packet network is operated cover the optical network. The main process 40 requires three supplied inputs. A first input is a packet network topology 42 including information such as a number of routers in the packet network, placement of router links and other pertinent information regarding the packet network. A second input is a packet traffic matrix 41, which defines data flow and bandwidth requirements in and out of the packet network. A third input is an optical network topology 43 including information such as a number of optical cross connect switches in the optical network, placement of optical links and other pertinent information regarding the optical network. A user supplies the three inputs 41,42,43. In some embodiments provided by the invention the three inputs 41,42,43 are generated by the user according to the desired topology of an overall network that is being modelled and the traffic flow in and out of the packet network.

Flow assignment for the packet network 44 is a multi-step sub-process of the main process 40 that establishes the flow and bandwidth capacity capable of being carried on the packets links of the packet network. The inputs to the flow assignment for the packet network 44 are the packet network topology 42 and the packet traffic matrix 41. The resultant output of the flow assignment for the packet network 44 is a simulated packet network comprising information regarding data flow and bandwidth capacity for the packet network so as to create a basic packet capacity 45 for packet links in the packet network.

Flow assignment for the optical network 46 is another multi-step sub-process of the main process 40 that establishes the flow and bandwidth capacity capable of being carried on the optical links of the optical network. The inputs to the flow assignment for the optical network 46 are the basic packet capacity 45 of the simulated packet network and the optical network topology 43. The output of the flow assignment for the optical network 46 is a simulated packet transport network 48 comprising information regarding data flow and bandwidth capacity for the optical network so as to create a basic optical capacity 47 for optical links in the simulated packet transport network 48.

The three supplied inputs, the packet network topology 42, the packet traffic matrix 41 and the optical network topology 43 are generated using appropriate information relevant to the packet and optical networks and the type of traffic being transmitted on the simulated packet transport network 48. For example, the optical network topology 43 may contain information such as a number of inputs and outputs of the optical cross-connect switches or information such as physical lengths of optical links. Further examples include information such as a number of wavelength channels used for signal transmission or information such as granularity of optical bandwidth for optical links. The packet traffic matrix 41 contains information such as the total traffic between router pairs in bits per second.

Figure 5:
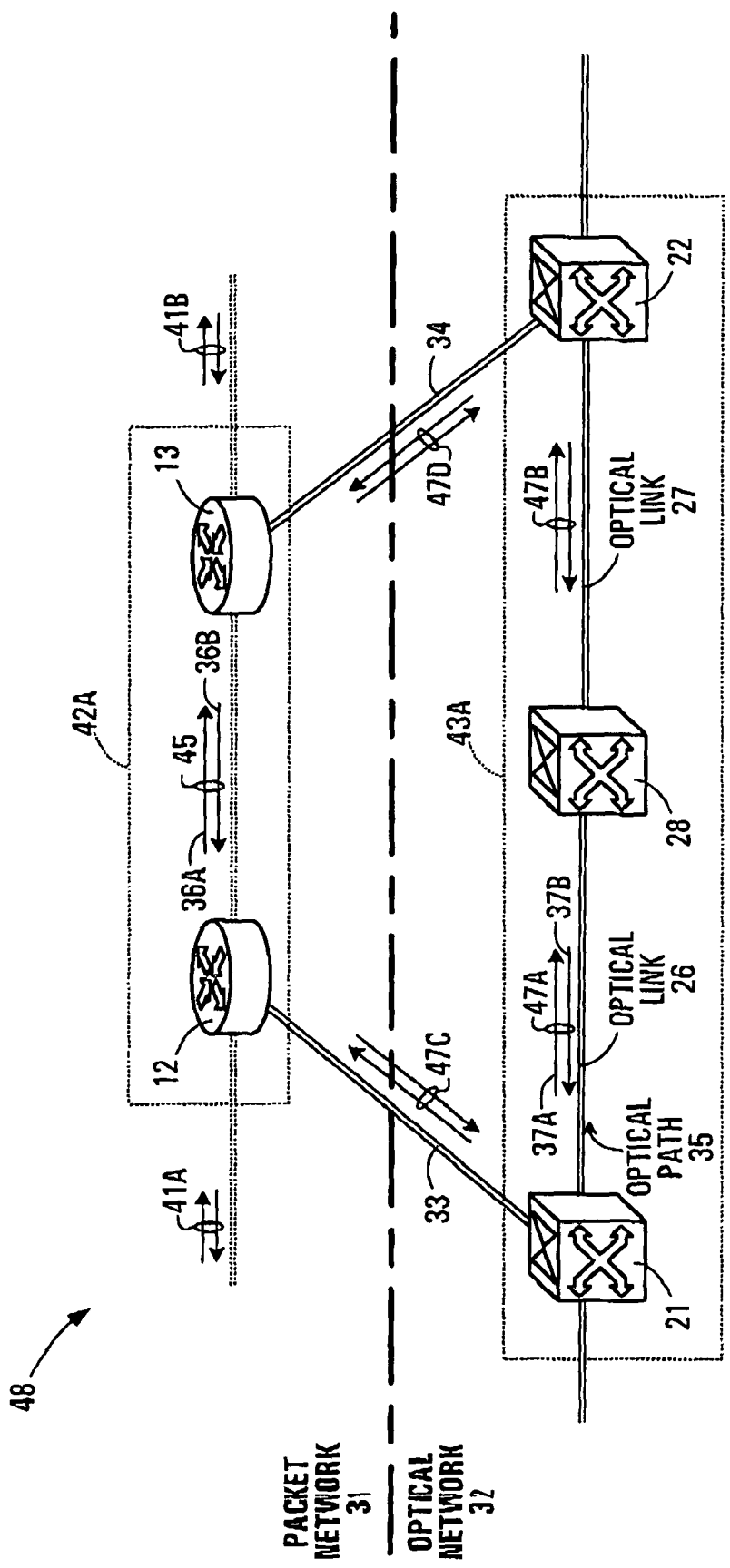
FIG. 5 is a schematic showing a portion of a simulated packet transport network based on FIG. 3, which demonstrates the representative inputs and outputs used in the steps of FIG. 4.

FIG. 5 uses the example packet transport network depicted in FIG. 3 to further demonstrate the type of information supplied as inputs and the resulting information generated as outputs in the method described by the flow chart of FIG. 4. The packet network topology 42 contains information as described above that is dependent upon elements in the packet network 42A, for example the first and second routers 12,13. The packet traffic matrix 41 contains information as described above that is dependent upon packet traffic flow inputs and outputs 41A,41B supplied to the first and second routers 12,13. The packet traffic matrix 41 represents the packet traffic flow that will pass through the packet network topology 42. A combination of the packet network topology 42 and the packet traffic matrix 41 is the simulated packet network. Flow assignment for the packet network 44 is represented by packet traffic flow capacities 36A,36B moving bi-directionally on the packet link 11. Flow assignment is based on data in the simulated packet network. The basic packet capacity 45 is represented by the total capacity of each packet link in the simulated packet network. In the example of FIG. 5, this is a sum of packet traffic flow capacities 36A plus 36B travelling on the packet link 11.

The optical network topology 43 contains information as described above that is dependent upon elements in the optical network 43A, for example first, second and third optical mesh protection cross-connect switches 21, 22, 28. A combination of the optical network topology 43 and the basic packet capacity 45 of the simulated packet network forms the simulated packet transport network 48. An example of the flow assignment for a single optical link performed during the flow assignment for the optical network 46 is packets 37A, 37B moving bi-directionally on the first optical link 26. The flow assignment is made based on data in the simulated packet transport network 48. Similar flow assignments are made on the first and second access links 33,34 and the second optical link 27. The basic optical capacity 47 is represented by the total capacity of each optical link in the simulated packet transport network 48. In the example of FIG. 5, the total capacity 47A of the first optical link 26 is the sum of the packet traffic flow capacities 37A plus 37B. The basic optical capacity 47 of the simulated packet transport network 48 is represented by the total capacities 47A, 47B, 47C, 47D of the first and second optical links 26, 27 and the first and second access links 33, 34 of the optical path between first and second routers 12, 13, respectively.

Figure 6A:
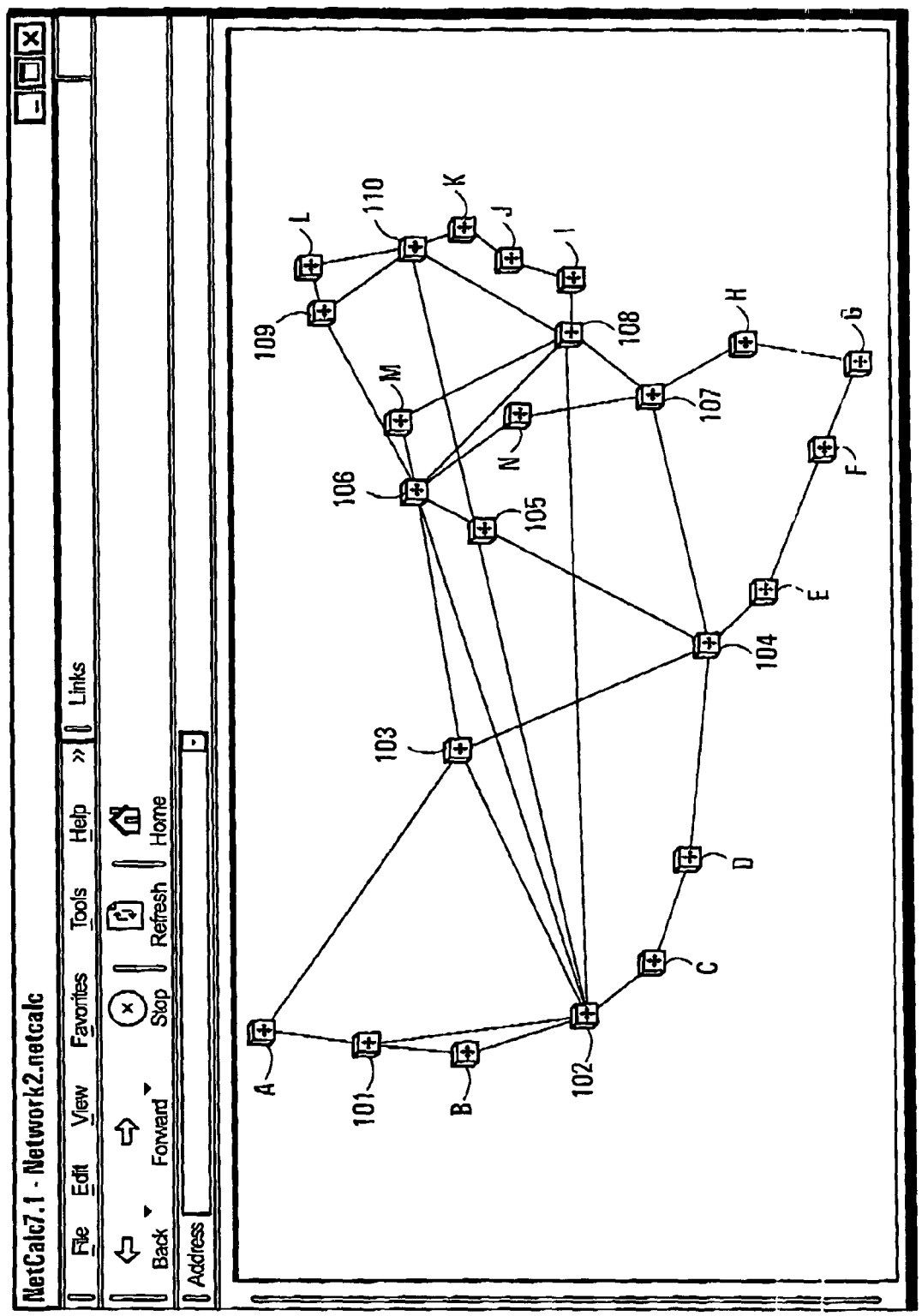
FIG. 6A is a schematic of a representation of a packet network topology us d as an input to the flow diagram of FIG. 4.

FIG. 6A displays an example of a visual interpretation of information supplied by the packet network topology 42. In the example of FIG. 6A there are 10 core routers and 14 edge routers. Core routers are labeled 101 to 110 and edge routers are labelled A to N. Core routers are connected to more than two other routers, whereas edge routers are connected to a maximum of two other routers.

Figure 6B:
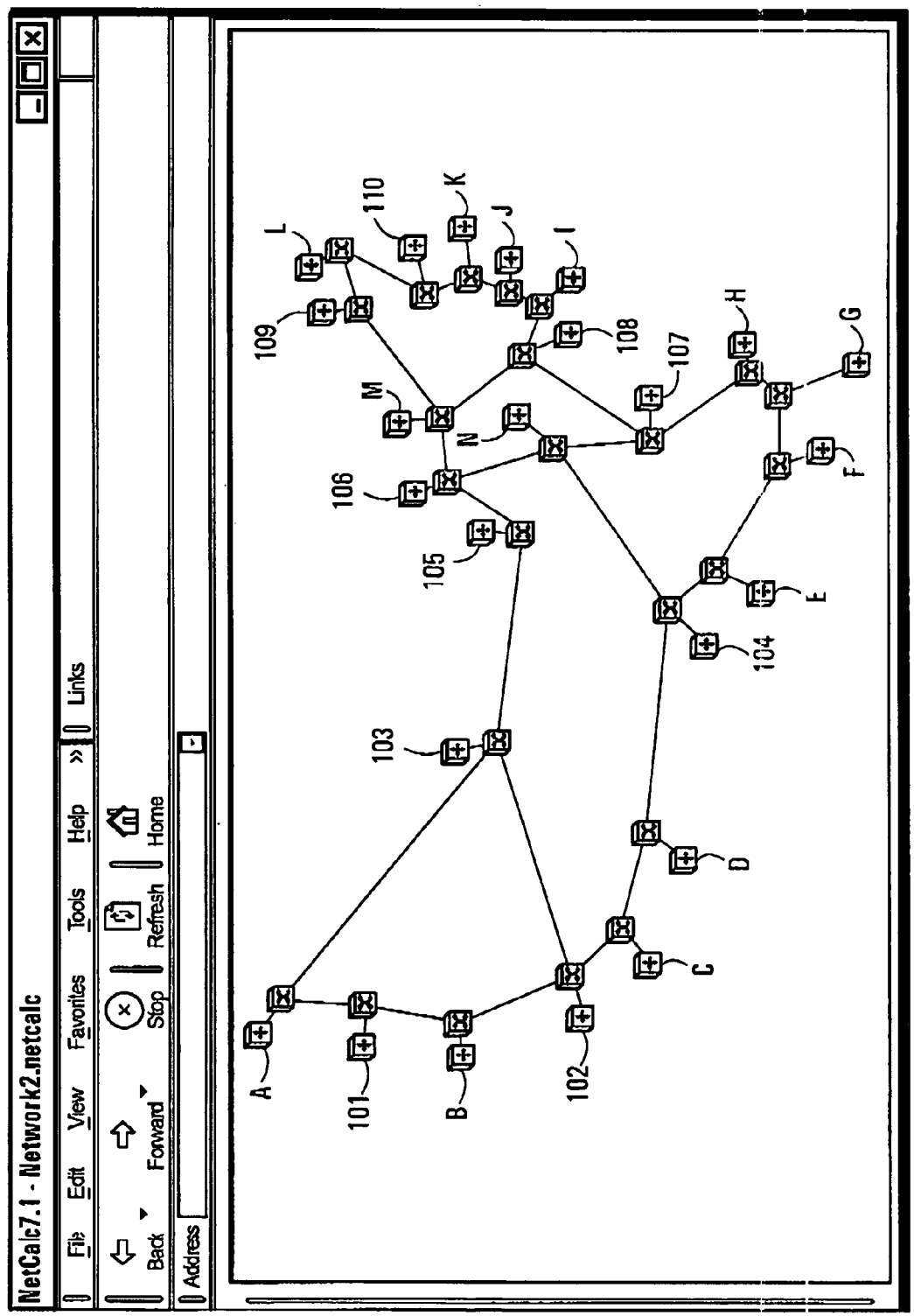
FIG. 6B is a schematic of a representation of an optical network topology used as an input to this flow diagram of FIG. 4.

FIG. 6B displays an example of a visual interpretation of information supplied by the optical network topology 43. In the example of FIG. 6B there are 24 optical cross connect switches. One optical cross connect switch is co-located with each of the 10 core routers and 14 edge routers. The optical links are linked over physical fiber routes.

Figure 7:
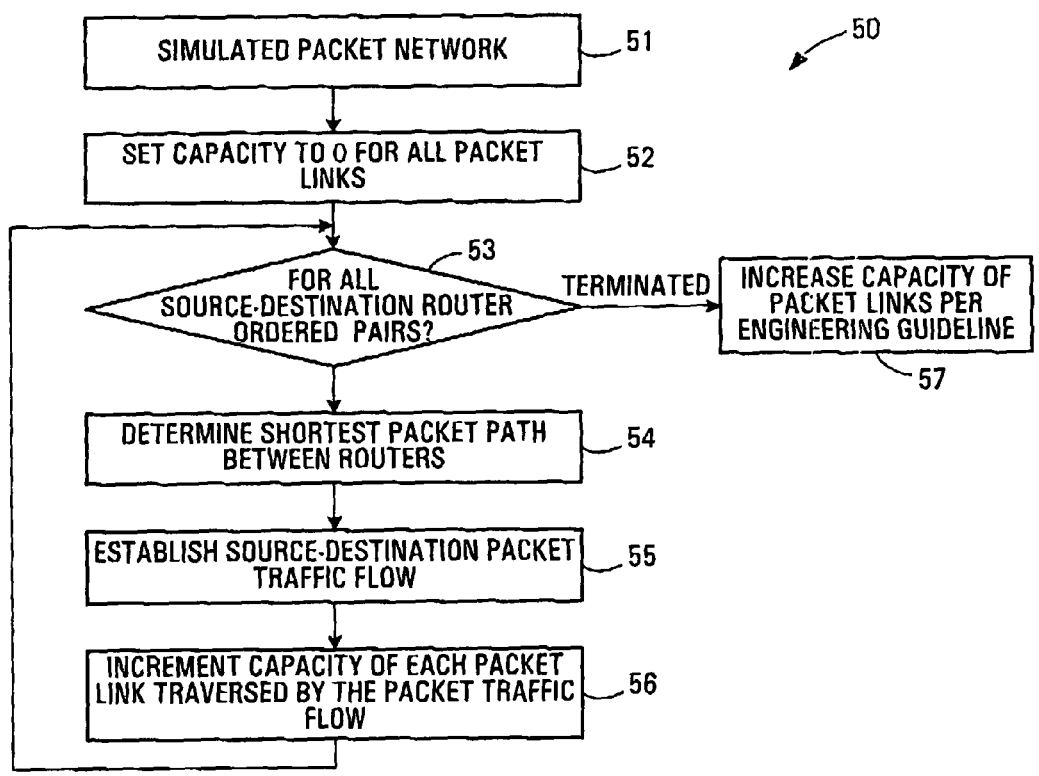
FIG. 7 is a flow chart which expands upon a step of flow assignment of a packet network as introduced in FIG. 4.

FIG. 7 displays a flow chart containing steps of a first sub-process 50, which expand upon the single step shown in FIG. 4 of flow assignment for the packet network 44. An input 51 to the first sub-process 50 is the simulated packet network resulting from the combination of the packet network topology 42 and the packet traffic matrix 41. In general, the simulated packet network comprises information regarding the topology of the packet network such as how many routers are in the packet network and information regarding physical router connections, as well as traffic flow information in and out of the simulated packet network.

An initial method step 52 of the first sub-process 50 involves setting bandwidth for all packet links of the input 51 to the first sub-process 50 to zero. Following the initial method step 52, a decision step 53 is required to ensure that three method steps 54,55,56 are performed for each ordered pair of source-destination routers.

In a first method step 54, a shortest packet path is determined between a pair of source-destination routers, based on positional router information as contained in the packet network topology 42 and traffic information as contained in the packet traffic matrix 41. In a second method step 55, a source-destination packet traffic flow, in some embodiments identified as a label switch path (LSP) traffic flow, is established over the shortest packet path as determined in the first step 54. In a third method step 56, bandwidth of each packet link traversed by the packet traffic flow is incremented by an amount equal to the capacity required by the packet traffic flow on that packet link. The three method steps 54,55,56 are performed for each ordered pair of source-destination routers. When the three method steps 54,55,56 have been performed for all router ordered pairs, as determined by the decision step 53, there exists a raw capacity value for each packet link based on multiple packet traffic flows that occur on each packet link of the packet network. A further method step 57 is necessary which involves increasing bandwidth of the packet links in order to meet packet network engineering guidelines. In this case, average occupancy of the packet link is an important packet network engineering guideline.

In a particular embodiment of the invention, the first method step 54 of determining the shortest packet path may be performed using a MPLS technique known as Opens Shortest Path First Traffic Engineering (OSPF-TE). In a particular embodiment of the invention, the second method step 55 of establishing the source-destination LSP may be performed using a MPLS technique known as Reservation Protocol Traffic Engineering (RSVP-TE).

A typical value used for the average occupancy of the packet link is 50% in the further method step 57 of the first sub-process 50. More generally, the average occupancy of the packet link varies based on a user's requirement for a specific packet transport network.

In a particular embodiment of the invention, the establishment of the source-destination packet traffic flow in the second method step 55 of the first sub-process 50 is based on a gravitational model. Traffic flow gravitational models essentially use the product of metropolitan populations divided by some weak function of physical distance between metro areas, such as the physical distance, a square root of the physical distance, or a constant.

Figure 8:
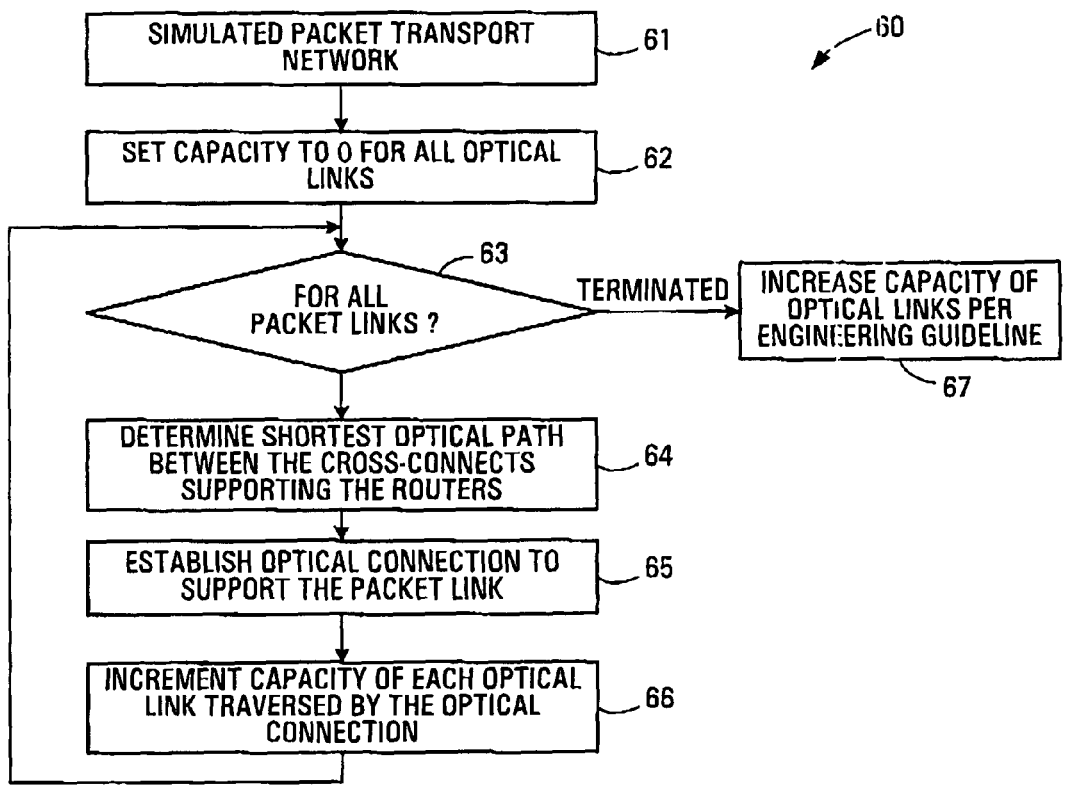
FIG. 8 is a flow chart which expands upon a step of flow assignment of an optical network as introduced in FIG. 4.

FIG. 8 displays a flow chart containing steps of a second sub-process 60, which expand upon the single step shown in FIG. 4 of flow assignment for the optical network 46. An input 61 to the second sub-process 60 is the simulated packet transport network 48 resulting front the combination of the optical network topology 43 and the basic packet capacity 45 of the simulated packet network. In general, the simulated packet transport network 48 comprises information regarding the topology of the optical network such as how many cross connect switches are in the optical network, information regarding physical router-cross-connect switch connections and placement of cross-connect switches in the optical network, as well as traffic flow information in and out of the simulated packet transport network 48.

An initial method step 62 of the second sub-process 60 involves setting capacity for all optical links of the input 61 to the second sub-process 60 to zero. Following the initial method step 62, a decision step 63 ensures that additional method steps 64,65,66 are performed for all packet links.

In a first method step 64, a shortest optical path between optical cross-connect switches supporting packet layer routers must be determined. In a second method step 65, an optical connection is established to support the packet link, wherein capacity of each packet link is a capacity previously determined within the flow assignment process described in FIG. 7. In a third method step 66, capacity of each optical link traversed by the optical connection must be incremented by an amount equal to the capacity required by the optical connection on that optical link. The three method steps 64,65,66 are performed for all packet links. When the three method steps 64,65,66 are performed for all packet links, as determined by the decision step 63, there exists a raw capacity value for each optical link based on multiple packet traffic flows that occur on each optical link of the optical network. A further method step 67 is necessary which involves increasing capacity of the optical links in order to fleet optical network engineering guidelines. In this case, occupancy of the optical link is an important optical network engineering guideline.

In a particular embodiment of the invention, the first method step 64 of determining the shortest path constraint between two cross-connect switches may be performed using a technique known as Open Shortest Path First Traffic Engineering (OSPF-TE) based Automatically Switched Optical Network (ASON) routing. In a particular embodiment of the invention, the second method step 65 may be performed using a technique known as Constraint-based Routing Label Distribution Protocol (CR-LDP) based ASON signaling.

In a particular embodiment of the invention, a typical value used for the occupancy of the optical link is 95% in the further method step 67 of the second sub-process 60. More generally, the optical network engineering guideline varies based on a user's requirement for a specific packet transport network.

The resultant output of the main process 40 yields two views of the network, a packet network view and an optical network view. The packet network view allows a user to determine how much bandwidth capacity has to be obtained from the optical network, and from where, in order to satisfy all of the packet network requirements. It is desirable that the bandwidth capacity requirements determined by the steps of the first sub-process 50 are expressed as a combined total of effective packet transport bandwidth and required overhead bandwidth.

Overhead consists of wasted bandwidth incurred by a network, additional bandwidth requirements based on engineering rules that dictate how much bandwidth must be set aside to handle traffic peaks, and additional protection bandwidth requirements that must always be available in case of a failure occurring in the network.

Similarly, the optical network view allows a user to determine how much bandwidth capacity has to be provisioned, such as how many wavelengths are used in the optical network and where. It is desirable that the bandwidth capacity requirements determined by the steps of the second sub-process 60 for the optical network view are expressed as a combined total of traffic carrying bandwidth and required overhead bandwidth.

The simulated packet transport network 48 created using the steps of the main process 40 of FIG. 4 described above meets general traffic requirements for communication systems. This output can be used to perform different forms of network analysis. For example, the simulated packet transport network 48 can be used to examine network capacity planning. Another example is that the simulated packet transport network 48 output can be used to examine protection requirements of the network. To evaluate protection requirements a survivability analysis must be performed.

Survivability is defined as a condition wherein failure of any single optical link will not prevent the packet transport network from meeting traffic carrying requirements. In some embodiments, the survivability analysis is performed assuming MPLS fast reroute protection in the packet network. In other embodiments, a survivability analysis is performed assuming optical mesh protection in the optical network. More generally, survivability analysis can be performed using any desired form of packet link protection in the packet network or the optical network.

Figure 9:
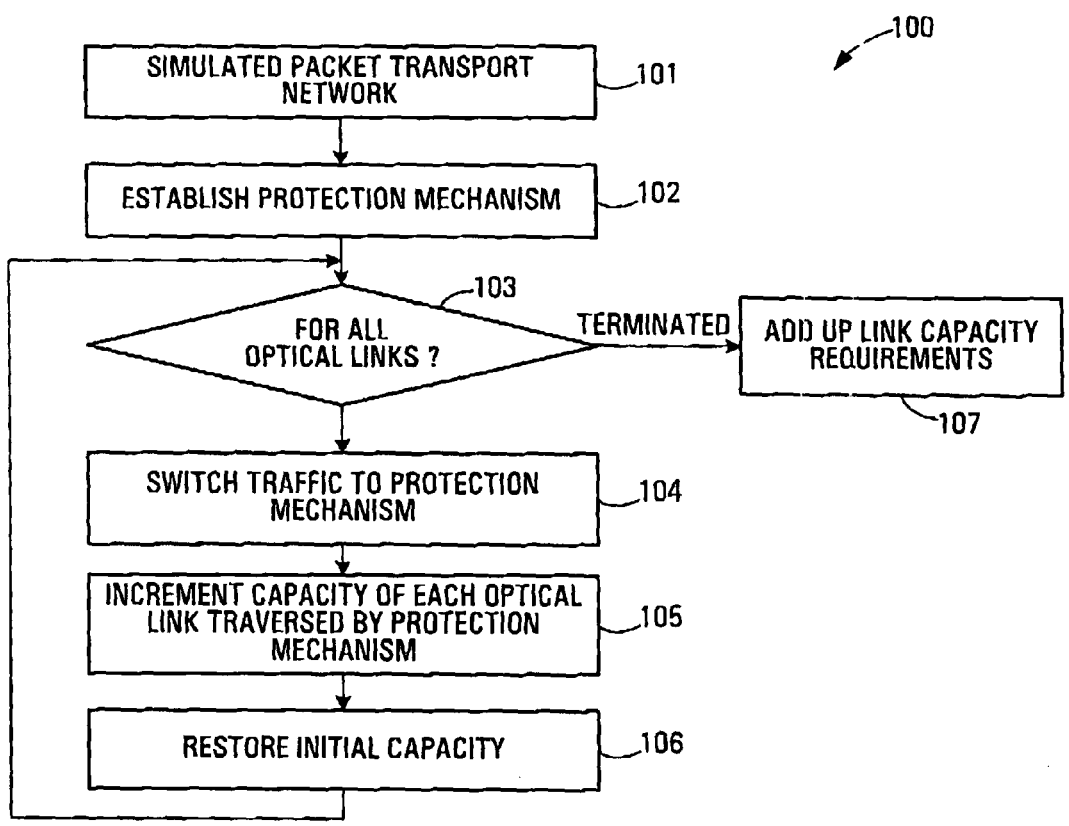
FIG. 9 is a flow chart for performing survivability analysis on a combined packet network and optical network.

FIG. 9 shows a flow chart for performing the basic steps of a survivability analysis process 100 for packet link protection in either the packet network or the optical network. For example, MPLS fast re-route in the packet network or optical mesh protection in the optical network. An input 101, in the form of the simulated packet transport network 48 from the main process 40 of FIG. 4 is supplied to the survivability analysis process 100. A location in the topology of the co-modelled packet transport network is chosen for an optical link failure to be simulated so that the survivability analysis process 100 can be performed.

An initial method step 102 of the survivability analysis process 100 requires that a protection mechanism be established for router pair connections. For example, packet links in the packet network or optical paths, in the optical network. Following the initial method step 102, a decision step 103 is required to ensure that method steps 104,105,106 are performed for all optical links in the optical network.

In a first method step 104, all affected optical connections are switched to the protection mechanism established in the initial method step 102. In a second method step 105, capacity of each optical link traversed by the protection mechanism is incremented and should include sufficient capacity to meet packet or optical network engineering guidelines. After the second method step 105 is completed initial conditions are restored 106 to the optical network before advancing to a next specific optical link and performing the same process. When all optical links in the optical network have been analyzed in this manner, as determined by the decision step 103, a further method step 107 of the survivability analysis process 100 involves adding up the capacity requirements. The output of the survivability analysis process 100 depends on what s user in interested in investigating. For example, it may provide the user a view of packet bandwidth requirements and a view of optical link capacity requirements under both normal and failure conditions, using packet link protection in either the packet network or the optical network.

Figure 10:
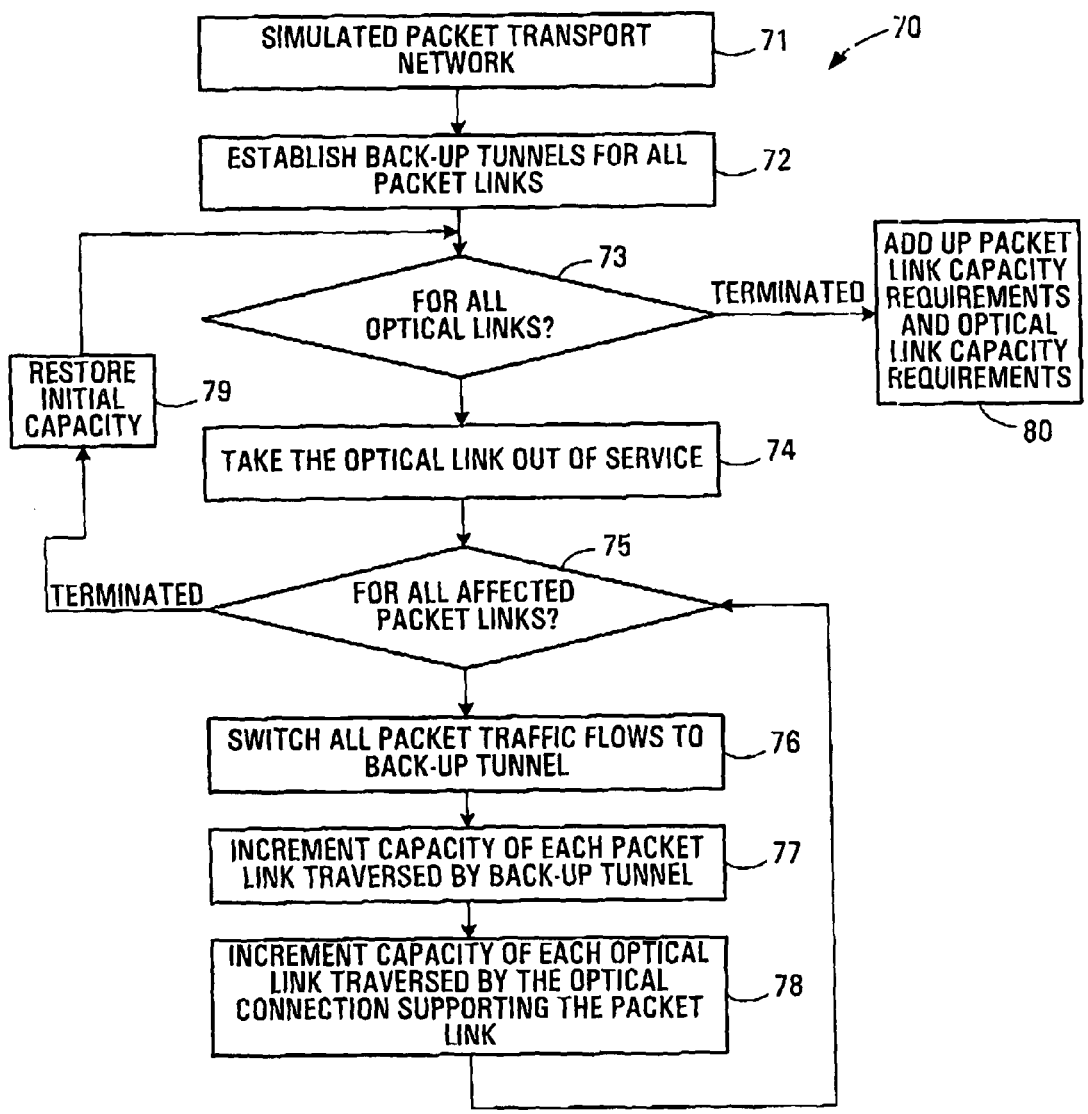
FIG. 10 is a flow chart for performing survivability analysis on a combined packet network and optical network using MPLS fast reroute protection.

To perform packet link protection in the packet network it is necessary to perform several additional steps during the survivability analysis process 100. Referring to FIG. 10, there is shown a flowchart of a packet network survivability analysis process 70, based on MPLS fast reroute packet protection. An input 71, in the form of the simulated packet transport network 48 from the main process 40 of FIG. 4 is supplied to the packet network survivability analysis process 70. A location in the topology of the co-modelled packet transport network is chosen for an optical link failure to be simulated so that the packet network survivability analysis process 70 can be performed.

An initial method step 72 of the packet network survivability analysis process 70 requires that back-up packet traffic flow tunnels be established for all packet links of the input 71. Back-up packet traffic flow tunnels are established in a manner that the packet links and the back-up packet traffic flow tunnels do not share the same optical links. Following the initial method step 72, a first decision step 73 is required to ensure that method steps 74,75,76,77,78,79 are performed for all optical links.

In a first method step 74, a first optical link is taken out of service. Following the first method step 74, a second decision step 75, is required to ensure a nested process of the method steps 76,77,78 is performed for each packet link affected by the optical failure. In a first method step of the nested process 76, all packet traffic flows are switched from the packet link affected by the optical failure to the back-up packet traffic flow tunnels established in the initial step 72. In a second method step of the nested process 77, a bandwidth of each packet link traversed by back-up packet traffic flow tunnels is incremented and should include sufficient bandwidth capacity to meet packet network engineering guidelines. In a third method step of the nested process 78, a capacity of each optical link traversed by an optical connection supporting the back-up packet traffic flow tunnel is incremented and should include sufficient bandwidth to meet optical network engineering guidelines. If a packet link on a current optical link is not affected by the optical failure then method steps 76,77,78 are skipped and the process advances to the next packet link. When the second decision step 75 has ensured that all the method steps of the nested process are completed, the nested process terminates. Initial conditions are restored 79 in both the packet network and the optical network before the first decision step 73 results in the process advancing to a next optical link to repeat the method steps 74,75,76,77,78,79 starting at the first method step 74. When all optical links have been analyzed in this manner, as determined by the first decision step 73, a further method step 80 of the packet network survivability analysis process 70 involves adding up packet link bandwidth requirements and optical link capacity requirements wherein bandwidth and capacity requirements are rounded up to the nearest packet link and optical link granularity increments, respectively. The output of the packet network survivability analysis process 70 gives a user a view of the packet bandwidth requirements and a view of the optical bandwidth requirements under both normal and failure conditions, using MPLS fast reroute protection.

In a particular embodiment of the invention, packet link occupancy is maintained at 50% in the second method step of the nested process 77 of the packet network survivability analysis process 70. More generally, the packet link occupancy varies based on a user's requirement for a given packet transport network.

In a particular embodiment of the invention, optical link occupancy is maintained at 95% in the third method step of the nested process 78 of the packet network survivability analysis process 70. More generally, the optical link occupancy varies based on a user's requirement for a given packet transport network.

In a particular embodiment of the invention, packet link granularity is maintained at 155 Mbits/s and optical link granularity is maintained at 10 Gbits/s in the further method step 80 of the packet network survivability analysis process 70. More generally, the packet link granularity and the optical link granularity vary based on a user's requirement for a given packet transport network, Referring to FIG. 11, there is shown a flowchart of an optical network survivability analysis process 90 based on optical mesh protection. An input 91, in the form of the simulated packet transport network 48 from the main process 40 of FIG. 4 is supplied to the optical network survivability analysis process 90. A location in the topology of the co-modelled packet transport network is chosen for an optical link failure to be simulated so that the optical network survivability analysis process 90 can be performed.

An initial method step 92 of the optical network survivability analysis process 90 requires that protection tunnels be established for all optical connections in the input 91. Protection tunnels are established in a manner that the working tunnels and the protection tunnels do not share the same optical links. Following the initial method step 92, a decision step 93 is required to ensure that method steps 94,95,96,97 are performed for all optical links in the optical network.

In a first method step 94, a first optical link is taken out of service. In a second method step 95, all affected optical connections are switched to a protection tunnel established in the initial method step 92. In a third method step 96, capacity of each optical link traversed by the protection tunnel is incremented and should include sufficient capacity to meet optical network engineering guidelines. After the third method step 96 is completed initial conditions are restored 97 to the optical network before advancing to a next optical link and performing the same process. When all optical links in the optical network have been analyzed in this manner, as determined by the decision step 93, a further method step 98 of the optical network survivability analysis process 90 involves adding up the optical link capacity requirements. The output of the optical network survivability analysis process 90 gives a user a view of the packet bandwidth requirements and a view of the optical link capacity requirements under both normal and failure conditions, using optical mesh protection. The packet bandwidth requirements of the co-modelled network remain unchanged, that is they are the same for a survivable or non-survivable network, when protection is provided by an optical mesh protection method.

In a particular embodiment of the invention, optical link occupancy is maintained at 95% in the third method step of the optical network survivability analysis process 90. More generally, the optical link occupancy varies based on a user's requirement for a given packet transport network.

In a particular embodiment of the invention, optical link granularity is maintained at 10 Gbits/s in the further method step 98 of the optical network survivability analysis process 90. More generally, the optical link granularity varies based on a user's requirement for a given packet transport network.

In some embodiments of the invention, the software known as Netcalc is used to generate the packet network topology 42, the optical network topology 43, the packet traffic matrix 41 and provide flow and capacity assignments for the packet network 44 and optical network 46 as depicted in FIG. 4. Netcalc is a capacity planning tool used for design and simulation of multi-layer wide area mesh networks both in the packet network and the optical network. Netcalc can simulate networks with over 1000 nodes, one million traffic flows, and 128 traffic classes. Netcalc can simulate many topologies such as hub-and-spoke, ring, fully-connected mesh. Netcalc can also simulate networks using a variety of routing algorithms.

Figure 11:
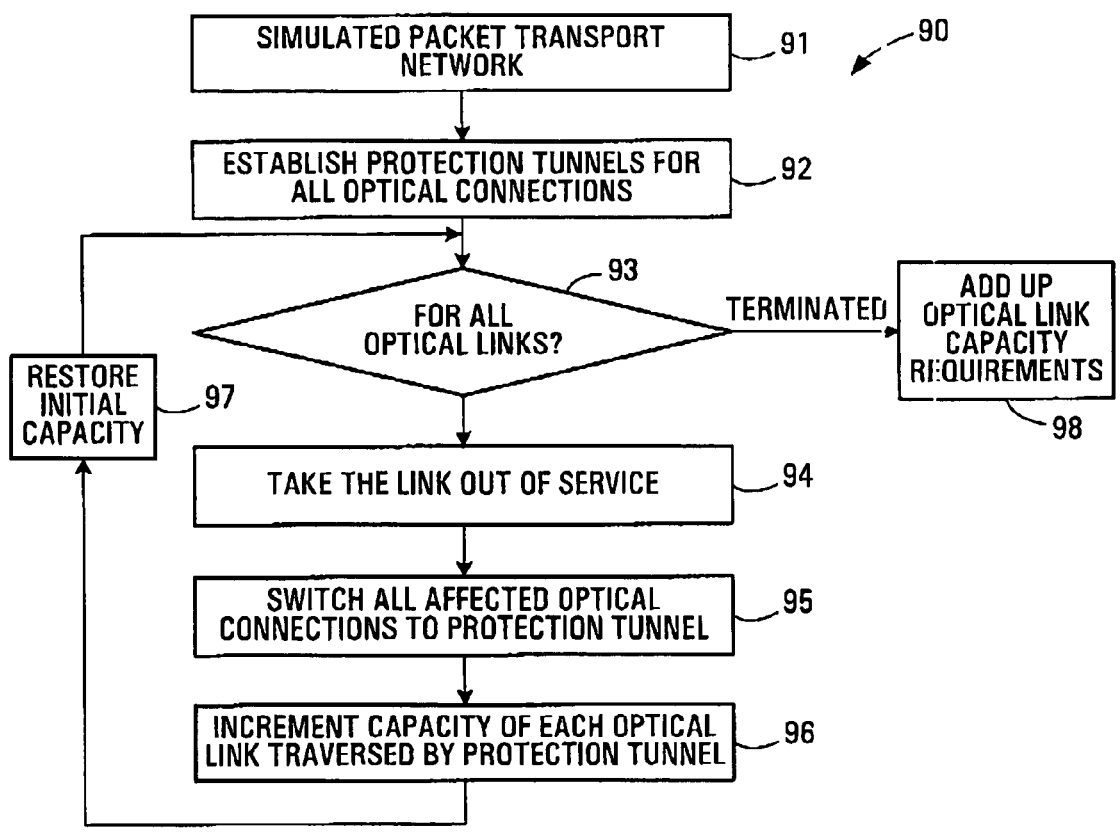
FIG. 11 is a flow chart for performing survivability analysis on a combined packet network and optical network using optical mesh protection.

In some embodiments of the invention, the software known as Netcalc can also be used to perform the packet network survivability analysis process 70 and the optical network survivability analysis process 90 as shown in FIGS. 10 and 11. In other embodiments software modules are created for use within Netcalc to perform the various described steps of the main process 40 and the packet network and optical network survivability analysis processes 70,90.

Embodiments of the present invention provide any computer language capable of developing software to perform mathematical calculations to be used to generate co-modelling analysis programs based on the main process 40 of FIG. 4. Embodiments of the present invention provide any computer language capable of developing software to perform mathematical calculations to be used to generate survivability analysis programs based on the packet network and optical network survivability analysis processes 70,90 of FIGS. 10 and 11.

Embodiments of the present invention provide the co-modelling analysis programs based on the main process 40 of FIG. 4 and survivability analysis programs based on the packet network and optical network survivability analysis processes 70,90 of FIGS. 10 and 11 to be stored on a computer useable medium such as a floppy disk, a computer hard-drive, a CD-ROM or any other conventional memory storage device.

Numerous modifications and variations of the present invention are possible in light of the above teachings. It is therefore to be understood that within the scope of the appended claims, the invention may be practised otherwise than as specifically described herein.

The invention claimed is:

1. A method for co-modelling a simulated packet network and a simulated optical network over which the simulated packet network operates on a computer comprising a processor and a computer-readable medium storing computer executable instructions for co-modelling the simulated packet network and the simulated optical network, the simulated packet network representing a plurality of packet links between packet network nodes and the simulated optical network representing a plurality of optical links between optical network nodes, the method comprising the steps of:
the processor generating a basic packet capacity comprising a capacity value for each packet link based on packet network topology information and packet traffic information; and
the processor generating a basic optical capacity comprising a capacity value for each optical link based on optical network topology information and the basic packet capacity, wherein the combination of the basic packet capacity and the basic optical capacity applied to the simulated packet network and a simulated optical network produce a co-modelled simulated packet transport network;
wherein the step of the processor generating a basic packet capacity further comprises the steps of:
the processor combining the packet network topology information in the form of a packet network topology input to the processor and the packet traffic information in the form of a packet traffic matrix input to the processor to create the simulated packet network; and
the processor assigning each packet link of the simulated packet network a flow to create the basic packet capacity for the simulated packet network; and
wherein the step of the processor generating a basic optical capacity comprises the steps of:
the processor combining the optical network topology information in the form of an optical network topology input to the processor and the basic packet capacity to form the simulated optical network; and
the processor assigning each optical link of the simulated optical network a flow to create the basic optical capacity for the simulated optical network.

2. A method for co-modelling according to claim 1, wherein the optical network topology input comprises information regarding a plurality of cross-connect switches in the simulated optical network and information regarding a plurality of optical links in the simulated optical network, wherein the processor assigning each optical link of the simulated optical network a flow comprises the steps of:
the processor setting capacity to zero for all optical links;
the processor performing a series of steps, as follows, for each packet link between two routers;
the processor determining a shortest optical path between cross-connect switches supporting the two routers;
the processor establishing an optical connection to support the packet link; and
the processor incrementing capacity of each optical link traversed by the optical connection; and
the processor increasing capacity of optical links per optical network engineering guidelines, wherein the optical network engineering guidelines pertain to occupancy of the respective optical links.

3. A method for co-modelling according to claim 1, the method further comprising the steps of:
supplying the packet network topology input to the processor;
supplying the packet traffic matrix input to the processor; and
supplying the optical network topology input to the processor.

4. A method for co-modelling according to claim 1, further comprising the processor generating the packet network topology input, the packet traffic matrix input and the optical network topology input for use in co-modelling the simulated packet network and the simulated optical network over which the simulated packet network operates.

5. A method for co-modelling according to claim 1, wherein the packet network topology input comprises information regarding a plurality of routers in the simulated packet network, information regarding source-destination router ordered pairs in the simulated packet network, and information regarding a plurality of packet links in the simulated packet network, wherein the processor assigning each packet link of the simulated packet network a flow comprises the steps of:
the processor setting capacity to zero for all packet links;
the processor performing a series of steps, as follows, for each source-destination router ordered pair;

the processor determining a shortest packet path between routers;

the processor establishing a source-destination packet traffic flow based on the shortest packet path; and the processor incrementing capacity of each packet link traversed by the packet traffic flow; and the processor increasing capacity of packet links per packet network engineering guidelines, wherein the packet network engineering guidelines pertain to average occupancy of the respective packet links.

6. A method for co-modelling according to claim 5, wherein the optical network topology input comprises information regarding a plurality of cross-connect switches in the simulated optical network and information regarding a plurality of optical links in the simulated optical network, wherein the processor assigning each optical link of the simulated optical network a flow comprises the steps of:

the processor setting capacity to zero for all optical links;

the processor performing a series of steps, as follows, for each packet link between two routers;

the processor determining a shortest optical path between cross-connect switches supporting the two routers;

the processor establishing an optical connection to support the packet link; and the processor incrementing capacity of each optical link traversed by the optical connection; and the processor increasing capacity of optical links per optical network engineering guidelines, wherein the optical network engineering guidelines pertain to occupancy of the respective optical links.

7. A method for co-modelling and analyzing a simulated packet network and a simulated optical network over which the simulated packet network operates on a computer comprising a processor and a computer-readable medium storing computer executable instructions for co-modelling the simulated packet network and the simulated optical network, the simulated packet network representing a plurality of packet links between packet network nodes and the simulated optical network representing a plurality of optical links between optical network nodes, the method comprising the steps of:

the processor generating a basic packet capacity comprising a capacity value for each packet link based on packet network topology information and packet traffic information; and the processor generating a basic optical capacity comprising a capacity value for each optical link based on optical network topology information and the basic packet capacity, wherein the combination of the basic packet capacity and the basic optical capacity applied to the simulated packet network and a simulated optical network produce a co-modelled simulated packet transport network; and the processor performing analysis on the co-modelled simulated packet transport network;

wherein the step of the processor generating a basic packet capacity further comprises the steps of:

the processor combining the packet network topology information in the form of a packet network topology input and the packet traffic information in the form of a packet traffic matrix input to create the simulated packet network; and the processor assigning each packet link of the simulated packet network a flow to create the basic packet capacity for the simulated packet network; and wherein the step of generating a basic optical capacity comprises the steps of:

the processor combining the optical network topology information in the form of an optical network topology input and the basic packet capacity to form the simulated network; and the processor assigning each optical link of the simulated optical network a flow to create the basic optical capacity for the simulated optical network.

8. A method for co-modelling and analyzing according to claim 7, wherein the step of the processor performing analysis on the simulated packet network and the simulated optical network over which the simulated packet network operates comprises the processor performing network capacity planning of the simulated packet network and the simulated optical network over which the simulated packet network operates.

9. A computer readable medium having computer executable instructions stored thereon for execution by a computer processor, for, when executed, co-modelling a simulated packet network and a simulated optical network over which the simulated packet network operates, the simulated packet network representing a plurality of packet links between packet network nodes and the simulated optical network representing a plurality of optical links between optical network nodes, the computer executable instructions comprising:

computer executable instructions for generating a basic packet capacity comprising a capacity value for each packet link based on packet network topology information and packet traffic information; and computer executable instructions for generating a basic optical capacity comprising a capacity value for each optical link based on optical network topology information and the basic packet capacity, wherein the combination of the basic packet capacity and the basic optical capacity applied to the simulated packet network and a simulated optical network produce a co-modelled simulated packet transport network;

wherein the computer executable instructions for generating a basic packet capacity comprise:

computer executable instructions for combining the packet network topology information in the form of a packet network topology input to the computer processor and the packet traffic information in the form of a packet traffic matrix input to the computer processor to create the simulated packet network; and computer executable instructions for assigning each packet link of the simulated packet network a flow to create the basic packet capacity for the simulated packet network; and wherein the computer executable instructions for generating a basic optical capacity comprise:

computer executable instructions for combining the optical network topology information in the form of an optical network topology input to the computer processor and the basic packet capacity to form the simulated optical network; and computer executable instructions assigning each optical link of the simulated optical network a flow to create the basic optical capacity for the simulated optical network.

10. A computer readable medium having computer executable instructions according to claim 9, the computer executable instructions comprising:

computer executable instructions for receiving a packet network topology input at the computer processor;

computer executable instructions for receiving a packet traffic matrix input at the computer processor; and computer executable instructions for receiving an optical network topology input at the computer processor.

11. A computer readable medium having computer executable instructions according to claim 9, further comprising computer executable instructions for generating the packet network topology input, the packet traffic matrix input and the optical network topology input for use in co-modelling the simulated packet network and the simulated optical network over which the simulated packet network operates.

12. A computer readable medium having computer executable instructions according to claim 9, wherein the packet network topology input comprises information regarding a plurality of routers in the simulated packet network, information regarding source-destination router ordered pairs in the simulated packet network, and information regarding a plurality of packet links in the simulated packet network, wherein computer executable instructions for assigning each packet link of the simulated packet network a flow comprises computer executable instructions for:
   setting capacity to zero for all packet links;
   performing a series of steps, as follows, for each source-destination router ordered pair;
      determining a shortest packet path between routers;
      establishing a source-destination packet traffic flow based on the shortest packet path;
      incrementing capacity of each packet link traversed by the packet traffic flow; and
   increasing capacity of packet links per packet network engineering guidelines, wherein the packet network engineering guidelines pertain to average occupancy of the packet links.

13. A computer readable medium having computer executable instructions according to claim 9, wherein the optical network topology input comprises information regarding a plurality of cross-connect switches in the simulated optical network and information regarding a plurality of optical links in the simulated optical network, wherein computer executable instructions for assigning each optical link of the simulated optical network a flow further comprises computer executable instructions for:
   setting capacity to zero for all optical links;
   performing a series of steps, as follows, for each packet link between two routers;
      determining a shortest optical path between cross-connect switches supporting the two routers;
      establishing an optical connection to support the packet link; and
      incrementing capacity of each optical link traversed by the optical connection; and
   increasing capacity of optical links per optical network engineering guidelines, wherein the optical network engineering guidelines pertain to occupancy of the respective optical links.

14. A computer readable medium having computer executable instructions according to claim 12, wherein the optical network topology input comprises information regarding a plurality of cross-connect switches in the simulated optical network and information regarding a plurality of optical links in the simulated optical network, wherein computer executable instructions for assigning each optical link of the simulated optical network a flow comprises computer executable instructions for:
   setting capacity to zero for all optical links;
   performing a series of steps, as follows, for each packet link between two routers;
      determining a shortest optical path between cross-connect switches supporting the two routers;
      establishing an optical connection to support the packet link; and
      incrementing capacity of each optical link traversed by the optical connection; and
   increasing capacity of optical links per optical network engineering guidelines, wherein the optical network engineering guidelines pertain to occupancy of the respective optical links.

15. A computer readable medium having computer executable instructions stored thereon for execution by a computer processor, for, when executed, co-modelling and analyzing a simulated packet network and a simulated optical network over which the simulated packet network operates, the simulated packet network representing a plurality of packet links between packet network nodes and the simulated optical network representing a plurality of optical links between optical network nodes, the computer executable instructions comprising:
   computer executable instructions for generating a basic packet capacity comprising a capacity value for each packet link based on packet network topology information and packet traffic information;
   computer executable instructions for generating a basic optical capacity comprising a capacity value for each optical link based on optical network topology information and the basic packet capacity, wherein the combination of the basic packet capacity and the basic optical capacity applied to the simulated packet network and a simulated optical network produce a co-modelled simulated packet transport network; and
   computer executable instructions for performing analysis on the co-modelled simulated packet transport network;
wherein the computer executable instructions for generating a basic packet capacity comprise:
   computer executable instructions for combining the packet network topology information in the form of a packet network topology input to the computer processor and the packet traffic information in the form of a packet traffic matrix input to the computer processor to create the simulated packet network; and
   computer executable instructions for assigning each packet link of the simulated packet network a flow to create the basic packet capacity for the simulated packet network; and
wherein the computer executable instructions for generating a basic optical capacity comprise;
   the computer executable instructions for combining the optical network topology information in the form of an optical network topology input to the computer processor and the basic packet capacity to form the simulated optical network; and
   the computer executable instructions for assigning each packet link of the simulated optical network a flow to create the basic optical capacity for the simulated optical network.

16. A computer readable medium having computer executable instructions according to claim 15, wherein the computer executable instructions for performing analysis on the simulated packet network and the simulated optical network over which the simulated packet network operates comprises computer executable instructions for network capacity planning of the simulated packet network and the simulated optical network over which the simulated packet network operates.

* * * * *